United States Patent
Davis, Jr. et al.

(10) Patent No.: US 6,334,149 B1
(45) Date of Patent: Dec. 25, 2001

(54) GENERIC OPERATING SYSTEM USAGE IN A REMOTE INITIAL PROGRAM LOAD ENVIRONMENT

(75) Inventors: Louis Freeman Davis, Jr., Paige; James Lee Magnuson; Michael Abraham Rothman, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/219,248

(22) Filed: Dec. 22, 1998

(51) Int. Cl.$^7$ ................................... G06F 15/16
(52) U.S. Cl. ................ 709/219; 709/220; 709/222
(58) Field of Search .................. 709/219, 652; 307/125; 713/1–2

(56) References Cited

U.S. PATENT DOCUMENTS

| | | | |
|---|---|---|---|
| 5,269,002 | * 12/1993 | Shinjo et al. | 709/700 |
| 5,347,167 | * 9/1994 | Singh | 307/125 |
| 5,452,454 | * 9/1995 | Basu | 713/2 |
| 5,577,210 | * 11/1996 | Abdous et al. | 709/219 |
| 5,675,800 | * 10/1997 | Fisher, Jr. et al. | 713/2 |
| 5,680,547 | * 10/1997 | Chang | 709/222 |
| 5,870,554 | * 2/1999 | Grossman et al. | 395/652 |
| 5,872,968 | * 2/1999 | Knox et al. | 713/2 |
| 6,052,779 | * 4/2000 | Jackson et al. | 713/2 |
| 6,073,232 | * 6/2000 | Kroeker et al. | 713/1 |

\* cited by examiner

*Primary Examiner*—David Wiley
(74) *Attorney, Agent, or Firm*—Duke W. Yee; Stephen J. Walder, Jr.; Jeffrey S. LaBaw

(57) ABSTRACT

A data-processing system provides a method for making a "snapshot" of critical system data areas, right after Power-On Self-Test and before the Remote Initial Program Load (RIPL) begins, by saving a copy of these critical system data areas. The RIPL software then retrieves a complete operating system image over a network and places the complete image in memory. The RIPL software then replaces the saved critical system data to create a system state in which the memory in the system includes the same content as it had just after it was booted, which also frees up the system memory and network support used by the RIPL software. The process then passes control to the appropriate location in the operating system image saved in memory so that the computer may continue the booting process.

21 Claims, 4 Drawing Sheets

GENERIC OPERATING SYSTEM USAGE IN A REMOTE INITIAL PROGRAM LOAD ENVIRONMENT

BACKGROUND OF THE INVENTION

1. Technical Field

The present invention relates, in general, to a method, system, and computer-program product for improved data processing in a computer system and, in particular, to a method, system, and computer-program product for providing an improved booting process for a data processing system.

2. Description of Related Art

In the early 1980s, as the first PC's were sold, people in the Information Systems (IS) industry thought that PC's might replace mainframe computers and cut operating costs drastically. Over the years, as personal computers gained more functionality and better user interfaces, end-users improved their productivity and ability to generate data. While enterprise data and legacy applications were still placed on the more reliable mainframe platforms, there was more and more need for distributed access to application and data resources.

The IS industry succeeded in connecting the two worlds of PC's and mainframes by implementing a client/server model with distributed databases. With the evolution of multi-platform applications over a variety of networking infrastructures, it appeared that PC's might replace mainframe computers. However, as people in the IS industry realized the immense overall costs of this approach, the client/server model evolved in many directions.

The choice of a wider variety of computer platforms improves the enterprise's ability to make appropriate investments in the evolving computing marketplace. The following is a description of various computer platforms and some of their characteristics.

Non-Programmable Terminals (NPT's) are often found in large enterprises connected to host-based applications systems. With the NPT, the user interface is managed and controlled by the central processing system. Historically, these terminals were the first to bring end-user access to information in the enterprise's central databases.

Network Computers (NC's), based on RISC processors, offer greater versatility than NPT's because they have a built-in capability to run emulation software and to provide access to Java™ and Windows™-based applications, such as browsers. NC's are typically implemented with only a general purpose processor, a system memory, and a communications port. Although other types of peripheral devices may be included, local drives, such as hard disk and floppy drives, are characteristically absent from such data processing systems. While the primary reason for not providing a local drive within such data processing systems is cost-saving, other reasons may include low-power requirement and compactness. Therefore, NC's typically rely upon network access to provide dynamic, non-volatile data storage capability. Managed PC's provide an Intel-based (or compatible) hardware platform that offers one the ability to run network computing operating systems. NC's and managed PC's are very similar. The major difference is that NC's generally have sealed cases and are not up-gradeable, while managed PC's have locked covers and can be upgraded.

Traditional PC's, such as desktop and laptop PC's, are designed to offer highly sophisticated end-user environments. People who travel a lot, or who work at various locations, may use laptop PC's that require local, nonvolatile storage devices and a fully functional set of applications wherever they are, whether or not there is network connection available. The installation of workgroup computing software and complete application suites requires a powerful machine with significant local networking capabilities.

Each of the various network computing platforms has advantages and disadvantages. NPT's have the advantage of presenting a standard platform to each user. However, as users become more technically sophisticated through everyday use of various computing devices, users demand more options in their access to data and to computing resources, which may not be available through the use of NPT's. Managed PC's may have the ability to be tailored for sophisticated users, but as their name implies, managed PC's are purposely restricted in the number and variety of the software applications and hardware configurations which are presented to the user.

Traditional PC's on a network have the advantage of providing extensive flexibility. In order to accommodate their need for computing resources, users may add peripherals and software applications directly to a PC, while a network administrator may provide other resources on the network for many users in a common fashion. The disadvantages include the immense burden placed on a network or system administrator in ensuring that the various PC's retain some semblance of a standard configuration. Certain operating systems, such as Microsoft Windows NT, provide various levels of system administration capabilities for accomplishing such tasks. However, enormous costs and amounts of time may be spent in accommodating user preferences while ensuring corporate directives for the use of standard configurations.

One of the main advantages of network computing is the any-to-any type of connectivity between applications without having to worry about the hardware or software platforms in use. Network computing can be described as the use of different open technologies providing connectivity, ease-of-use, application functionality, information access, scalability, and systems management across widely dispersed types of networks. By making use of open standard technologies, network computing provides many advantages of the client/server paradigm while avoiding its numerous disadvantages. This goal could be achieved by the implementation of standards on all the platforms involved, such as TCP/IP, for the networking protocol, and 100% pure Java™ applications, in the hope that it will lead to truly portable applications, and solutions where in the network computing environment, all devices are able to easily communicate with one another. Another advantage of network computing with NC's is the ability to provide functions for accessing data and applications while reducing the overall costs of operating an enterprise-wide environment. One may choose from a wider scope of configurations for the NC's to fit corporate requirements and reduce the overall costs. However, if the network computing environment is not managed properly, the administrative time and costs may be greater than those incurred in a traditional PC network. One disadvantage is that NC's, relative to other technologies, are still in a development and exploratory stage, although the IS industry believes that a networking platform with NC's may provide user-desired preferences while accomplishing corporate goals.

A common problem in many computing platforms is the necessity to maintain system administrative knowledge of enterprise-wide computer configurations while allowing some type of flexibility in the computer configurations.

When one discusses the configuration of a computer, though, one necessarily must address multiple operating systems as different operating systems continue to be developed and deployed. A portion of any solution to the configuration-maintenance problem must also address the operating system configuration within the enterprise.

Looking towards a transition to network computing, the new network computing devices will not entirely replace the PC. Because different users have varying application needs, different technologies have to be employed to serve those needs, and those different technologies will be accompanied by different operating systems. Hence, there is a need for enterprise-wide support of multiple operating systems for these different computing platforms.

One solution to supporting multiple operating systems has been to develop the ability to boot a local client or NC through a remote server. In the normal operation of a stand-alone computer system, a user issues a boot command to the computer. The computer responds to the boot command by attempting to retrieve the operating system image files. Configuration data files are also needed to configure the specific machine with the hardware parameters necessary for the specific hardware configuration. These files also contain information needed to initialize the video, printers, and peripherals associated with that particular machine. For example, the files would include CONFIG.SYS in the MS-DOS operating system, available from Microsoft Corporation.

By booting through a remote server, the operating system image files may be maintained commonly on the server in an effort to control computer configurations. The network computing approach frequently provides three tiers of computing platforms, as described in FIGS. 1–3. This three-tier environment consists of: a client workstation, which handles the user interface and a minimal set of application functions; a server, which provides the major application functions; and a central corporate processing network, which provides access to legacy data and legacy applications. In a system where the computer has no nonvolatile memory means, the computer can not retrieve the boot information from within the computer itself. In that case, the client, e.g., computer system 108, 110, or 112 in FIG. 1 or data processing system 300 in FIG. 3, sends the boot request via the network bus 102 to a server 104, which may be acting as a boot server.

As an example of an environment, which employs remote booting, the WorkSpace On-Demand environment, available from International Business Machines, provides a protocol for remote booting called Remote Initial Program Load (RIPL). The WorkSpace On-Demand client supports native execution of MS-DOS and Windows 3.x, all of which are available from Microsoft Corporation, and OS/2, which is available from International Business Machines.

RIPL is the process of loading an operating system onto a workstation from a location that is remote to the workstation. The RIPL protocol was co-developed by 3Com, Microsoft and IBM. It is used today with IBM OS/2 Warp Server, DEC Pathworks, and Windows NT. Two other commonly used Remote IPL protocols are a Novell NCP (NetWare Core Protocol), and BOOT-P, an IEEE standard, used with UNIX and TCP/IP networks.

RIPL is achieved using a combination of hardware and software. The requesting device, called the requester or workstation, starts up by asking the loading device to send it a bootstrap program. The loading device is another computer that has a hard disk and is called the RIPL server or file server. The RIPL server uses a loader program to send the bootstrap program to the workstation. Once the workstation receives the bootstrap program, it is then equipped to request an operating system, which in turn can request and use application programs. The software implementations differ between vendors, but theoretically, they all perform similar functions and go through a similar process.

In the WorkSpace On-Demand environment, with reference to FIG. 3, the client workstation requires a special ROM installed on its LAN adapter 310. This ROM is also known as a Boot ROM or RIPL Module, which contains the initial code to begin the booting process. After the RIPL ROM on the adapter card receives the boot block from the boot server, the boot block gets control and then emulates a floppy drive. It takes over the floppy drive interrupt (Int 13$h$). As far as the workstation is concerned, it then has an "A:" drive with a write-protected bootable disk in it.

When the workstation starts up and issues a read request, the boot block intercepts the request and converts it into a network read request. Instead of reading data from the floppy, the data comes from the modified boot image file. For the RIPL function to be operational on a network, the network must have a RIPL server and one or more workstations with the necessary boot block module on its adapters.

Since the workstation thinks that it has a floppy drive, it requires all of the low-level data normally contained on a floppy disk. This includes the system sectors, FAT table, and directory tables. The Boot ROM obtains this information from a modified boot image file created on the server. The diskette image consists of a CONFIG.SYS file and the necessary device drivers that are required for the desired configuration. The modified boot image file is an exact image of the floppy that the workstation believes is in drive "A:".

The client operating system image and all applications reside on servers. The client does not have local nonvolatile storage, i.e., storage that persists from one logon session to another, and end-user data is stored elsewhere on the network, usually on the server. When the end-user logs off or turns off the WorkSpace On-Demand client, the operating system, programs, and end-user data are no longer available to the end-user and are reloaded from the server when the end-user logs on again.

After the end-user logs on, the end-user desktop may then display the program objects for each application for which the end-user has access. When the end-user selects an application to run, the application launcher starts the application. The application launcher is a utility that attaches the appropriate network devices, sets up the environment, requests the application from the server, and starts the application on the client machine. When an application is started, the application environment is established, e.g., PATH, DPATH, and LIBPATH values. File access requests are routed based on the in-memory merge of the machine FIT (File Index Table) and user FIT tables. Upon application exit, the application launcher releases network devices used solely by the application.

There are several problems associated with Remote IPL'ing an operating system. First, the Remote IPL is dependent upon the particular operating system's file system architecture. The manner in which the operating system image and configuration files must be retrieved may vary from operating system to operating system. Second, the Remote IPL process may use some critical memory which is never freed to the operating system. Third, the operating system may be left with the inability to load its own networking support due to the exclusive use of the networking hardware by the Remote IPL code, which may prevent the operation system from using TCP/IP.

Thus, there is a need for a generic method for remote booting of a client computer regardless of the type of operating system while avoiding the potential problems identified above.

SUMMARY OF THE INVENTION

In view of the foregoing, it is therefore an object of the present invention to provide an improved method, system, and computer-program product for data processing.

It is another object of the present invention to provide an improved method, system, and computer-program product for providing a remote boot capability regardless of the type of operating system, which is being booted.

In accordance with a preferred embodiment of the present invention, a data-processing system provides a method for making a "snapshot" of critical system data areas, right after Power-On Self-Test and before the Remote IPL begins, by saving a copy of these critical system data areas. The RIPL software then retrieves a complete operating system image over a network and places the complete image in extended memory. The RIPL software then replaces the saved critical system data to create a system state in which the memory in the system includes the same content as it had just after it was booted, which also frees up the system memory and network support used by the Remote IPL software. The process then passes control to the appropriate location in the operating system image saved in extended memory so that the computer may continue the booting process.

One of the advantages of the present invention is its ability to load nearly any target operating system as a RIPL client. The RIPL client need not be concerned with RIPL environment restrictions as system resources used during the Remote IPL process are freed when the loaded operating system is booted.

Another advantage is that through a snapshot of key system data areas during initialization and the use of a bootable image, the system can be reset using the snapshot data area rather than being left in a state partially tailored to the Remote IPL process since the virtual bootable image is loaded as a new operating system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
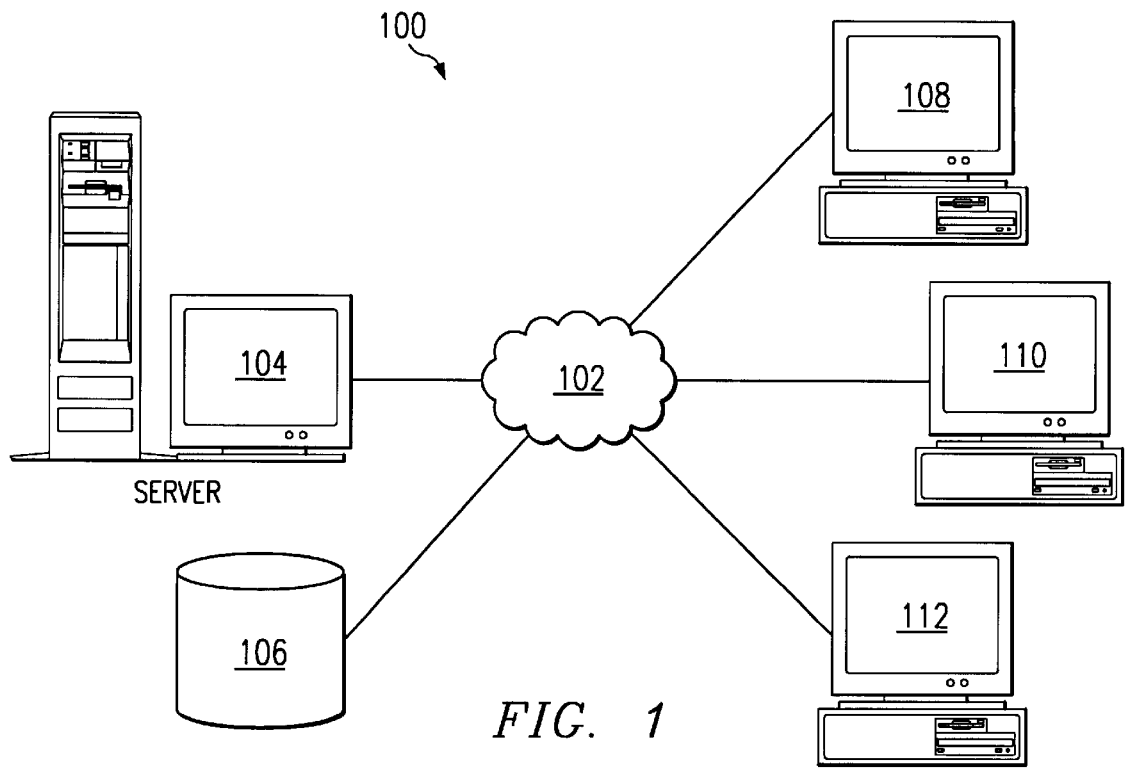
FIG. 1 is a block diagram of a distributed data processing system, which may be utilized in conjunction with a client-server environment.

With reference now to the figures, FIG. 1 depicts a pictorial representation of a distributed data processing system in which the present invention may be implemented and is intended as an example, and not as an architectural limitation, for the processes of the present invention.

Distributed data processing system 100 is a network of computers which contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Server 104 may also act as a boot server because it stores the files and parameters needed for booting each of the unique client computers systems 108–112.

Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as a number of different types of networks, such as for example, an intranet, a local area network (LAN), or a wide area network (WAN).

Figure 2:
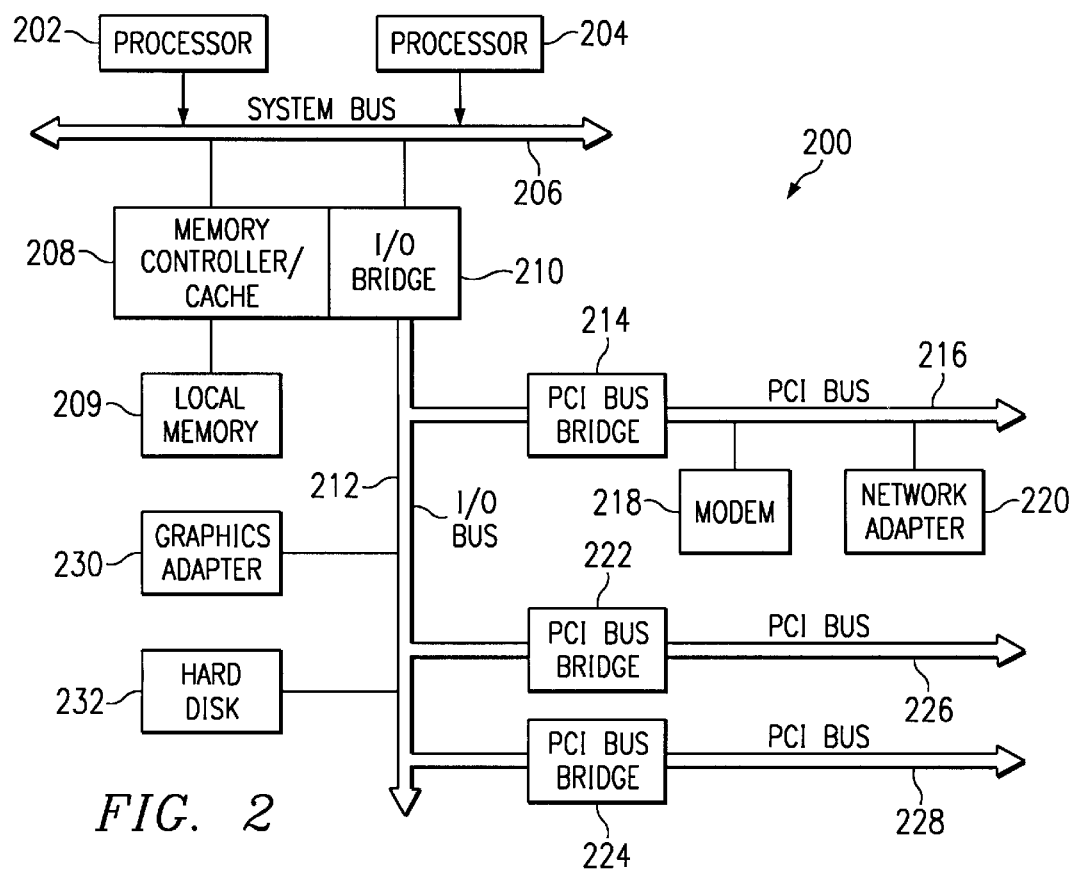
FIG. 2 is a block diagram of a server computer, which may be utilized in conjunction with a client-server environment.

Referring to FIG. 2, a block diagram depicts a data processing system, which may be implemented as a server, such as server 104 in FIG. 1 in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly. Those of ordinary skill in the art will appreciate that the hardware depicted in FIG. 2 may vary. For example, other peripheral devices, such as optical disk drive and the like also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, New York, running the Advanced Interactive Executive (AIX) operating system.

Figure 3:
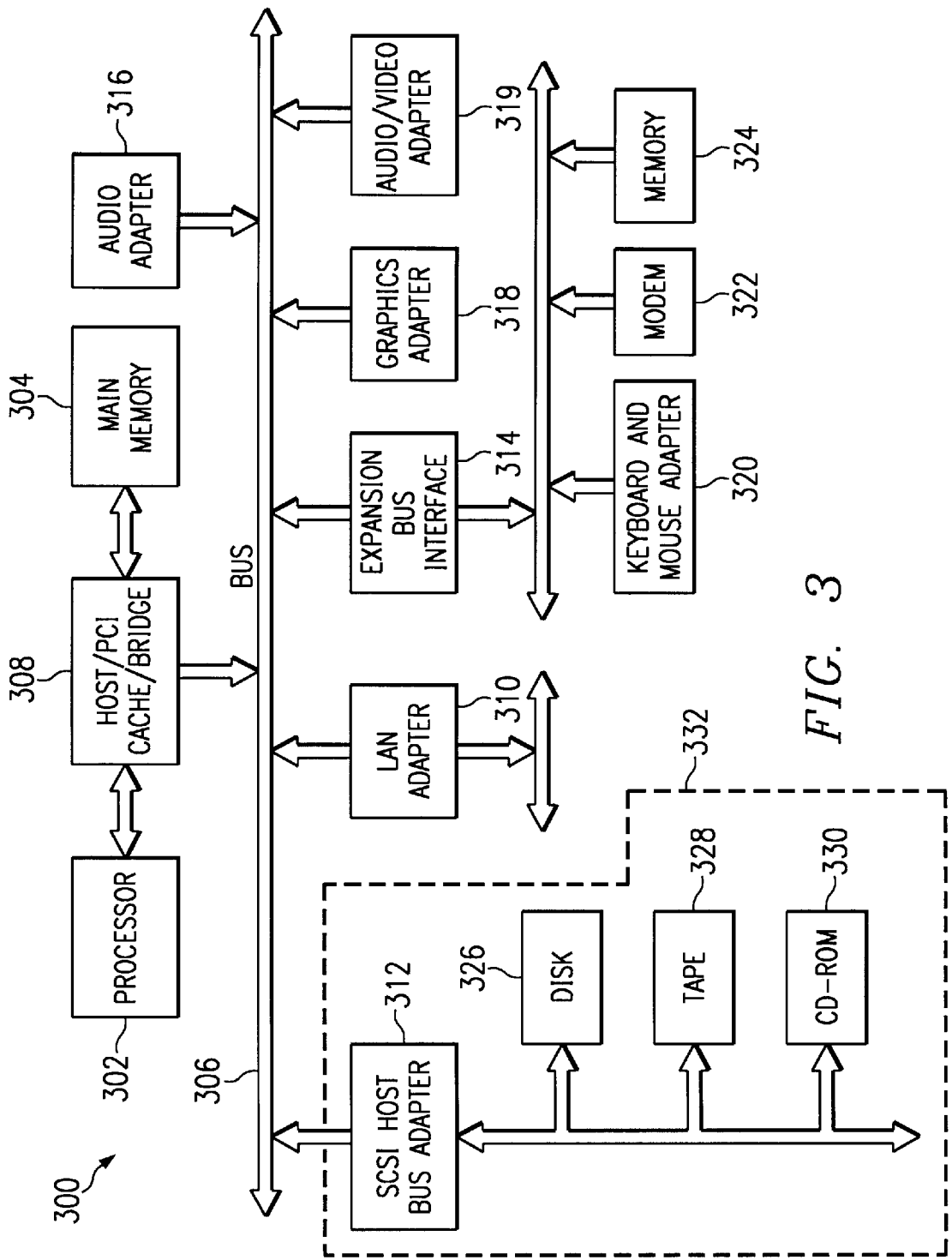
FIG. 3 is a block diagram of a computer, which may be utilized as a stand-alone computer or as a client computer in conjunction with a client-server environment.

With reference now to FIG. 3, a block diagram illustrates a data processing system in which the present invention may be implemented. Data processing system 300 is an example of either a stand-alone computer, if not connected to distributed data processing system 100, or a client computer, if connected to distributed data processing system 100. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM 330 in the depicted example. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system, such as Java, may run in conjunction with the operating system and provides calls to the operating system from Java programs or applications executing on data processing system 300. "Java" is a trademark of Sun Microsystems, Inc. Instructions for the operating system, the object-oriented operating system, and applications or programs may be located on storage devices, such as hard disk drive 326, and they may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by the box with the dotted line in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations with respect to the present invention.

Figure 4:
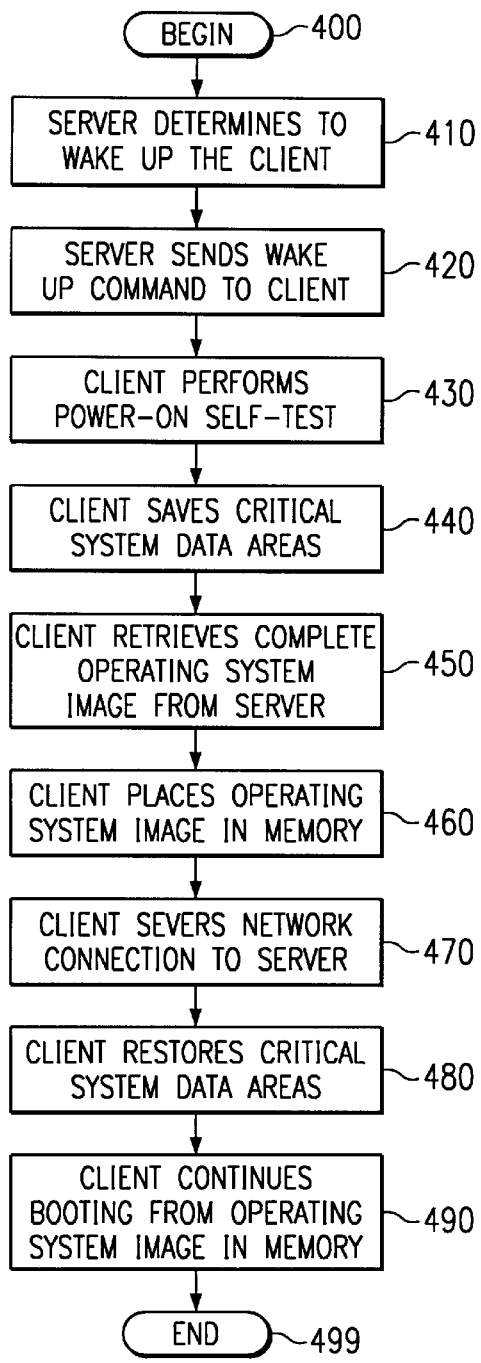
FIG. 4 is a flowchart of the Remote Initial Program Load (RIPL) process according to the preferred embodiment of the invention.

With reference now to FIG. 4, a flowchart depicts the Remote Initial Program Load (RIPL) process according to the preferred embodiment of the invention. The process begins (step 400) when a server 200 determines that it should wake up a client computer, such as client 110 (step 410). Server 200 sends a wake-up command to client (step 420).

The wake-up may be performed by sending a command to the token-ring card of client 110 to force its power-up. As noted previously, in the WorkSpace On-Demand environment, client 110 contains a ROM, also known as a Boot ROM or RIPL Module, which contains the initial code to begin the booting process. These methods for waking-up client 110 are exemplary only as other methods could be used to initiate the waking-up process of client 110 prior to its actual bootup processing.

Client 110 then usually performs a Power-On Self-Test (POST) (step 430), which may include a processor checkout, memory read/write tests, and other well-known component tests. After the POST, client 110 saves critical system data areas by taking a "snapshot" of those areas (step 440), i.e., client 110 creates an exact byte-by-byte copy of the contents of those areas and saves this snapshot to a portion of memory which will not be disturbed or overwritten by subsequent processing. Client 110 then retrieves a complete operating system image file from server 200 (step 450). The operating system image file contains all necessary code and data for a computer to boot itself. Client 110 then places the operating system image file in memory (step 460). The location in memory should be such that the contents of the memory are not disturbed or overwritten until modified as part of the computer bootup sequence.

Client 110 then severs its network connection to server 200 (step 470) in order to ensure that the network hardware may be controlled and commanded as part of the subsequent bootup process since client 110 may load its own network protocol after the Remote IPL process is complete. If the boot image was previously modified to include the loading of a network device driver or otherwise providing for establishment of a network connection, then client 110 may establish a predetermined network protocol according to the predetermined preference stored in the operating system image. In this manner, the network connection between client 110 and server 200 may be severed but then reestablished.

Client 110 then restores critical system data areas (step 480). The data may be restored in a variety of manners: making an exact copy of the previously stored data and placing the copied data back in its appropriate location; memory block transfer; or other equivalent manners. After the restoration of the data, various memory sections may need to be reinitialized, etc., in order to "clean up" the memory after the RIPL process in order to prepare for subsequent bootup processing.

Client 110 then continues booting from the operating system image in memory (step 490). The process continues by passing control to the appropriate location or instruction in the operating system image which, in non-RIPL environments, might be called to begin the bootup process. Control may be passed by various well-known methods, such as a jump-and-execute assembly instruction, etc. The RIPL bootup process then ends (step 499).

Figure 5A:
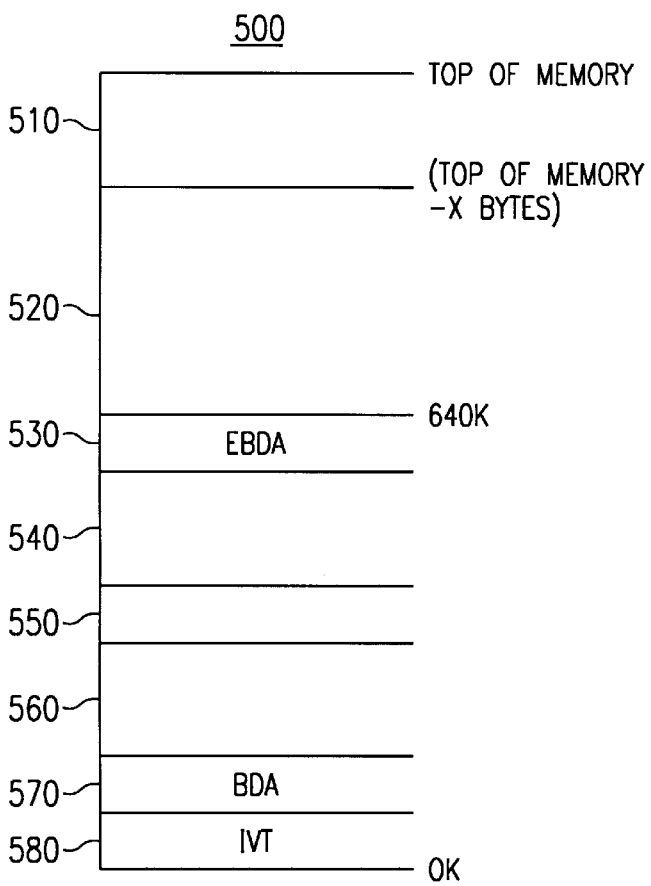
FIG. 5A is a memory map diagram of the contents of client memory immediately after the Power-On Self-Test for an exemplary Network Computer booting under DOS.
Figure 5B:
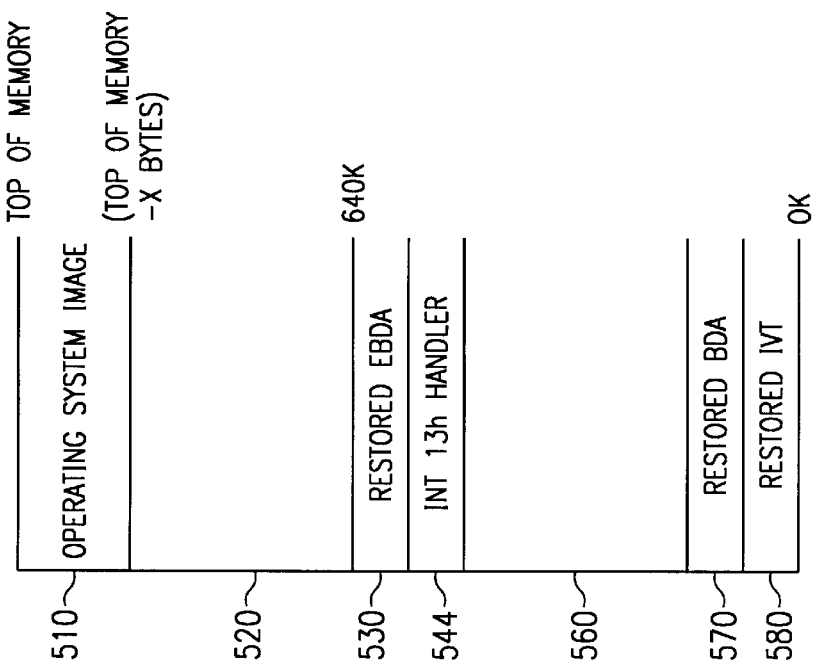
FIG. 5B is a memory map diagram of the contents of client memory immediately after saving critical system data areas and loading the operating system image for an exemplary Network Computer booting under DOS.
Figure 5C:
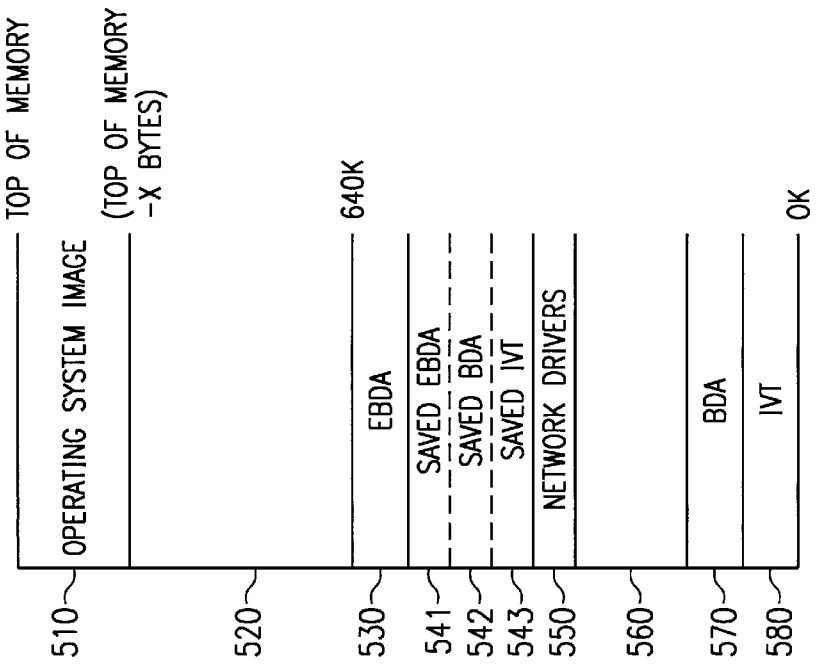
FIG. 5C is a memory map diagram of the contents of client memory immediately after restoring critical system data areas and immediately before continuing the boot process for an exemplary Network Computer booting under DOS.

FIGS. 5A–5C provide an example of the Remote IPL process, as discussed above with respect to FIG. 4, for a client which is booting up under DOS. FIGS. 5A–5C contain common numbers which refer to common elements in the figures.

With reference now to FIG. 5A, a memory map diagram depicts the contents of client memory immediately after the Power-On Self-Test for an exemplary NC or client 110 booting under DOS. Memory 500 contains empty memory areas 510, 520, 540, 550, and 560. Memory area 570 contains BIOS Data Area (BDA) in memory addresses 0:400→0:500, which contains data values needed by the BIOS, or Basic I/O System. The BIOS is a set of essential instructions necessary for booting a PC and is stored in a ROM within the PC. The BDA provides a writable memory area into which the BIOS may save data. Memory area 530 contains Extended BIOS Data Area (EBDA) in memory addresses 0:9FC00→0:9FFFF, which provides the BIOS an extended memory area for saving data. Memory area 580 contains the Interrupt Vector Table (IVT) in memory addresses 0:0→0:400, which is a table of memory addresses, or pointers to the locations in memory, where instructions for an interrupt handler may be found.

With reference now to FIG. 5B, a memory map diagram depicts the contents of client memory immediately after saving critical system data areas and loading the operating system image for an exemplary NC or client 110 booting under DOS. Memory 500 contains empty memory areas 520 and 560.

Memory area 570 contains the BDA. Memory area 530 contains the EBDA. Memory area 580 contains the IVT.

Memory areas 550, 541, 542, 543, and 510 have been modified in the period between the completion of the POST in step 430 and the current execution point after step 460. Memory area 550 contains network drivers, which the initial RIPL processing has loaded into memory in order to communicate with server 200. Memory area 510 contains an operating system image file which client 110 has retrieved from server 200 in step 450 through the use of the network drivers in memory area 550 and subsequently placed into memory area 510 in step 460. Memory areas 541, 542, and 543 contain saved copies of critical system data areas-the EBDA, the BDA, and the IVT-created as part of the "snapshot" process in step 440.

It should be noted that, at the current execution point after step 460: memory area 541 is not identical to memory area 530; memory area 542 is not identical to memory area 570; and memory area 543 is not identical to memory area 580. Memory areas 530, 570, and 580 may have changed during the execution of the RIPL processing. It is for this reason that these memory areas have been saved previously. By saving these memory areas, the RIPL processing may proceed without regard to its execution environment.

With reference now to FIG. 5C, a memory map diagram depicts the contents of client memory immediately after restoring critical system data areas and immediately before continuing the boot process for an exemplary NC or client 110 booting under DOS. Memory 500 contains empty memory areas 520 and 560.

Memory area 530 contains the restored EBDA. Memory area 570 contains the restored BDA. Memory area 580 contains the restored IVT. The restored contents of these areas are the previously saved critical system data areas which were stored in memory areas 541, 542, and 543, respectively. Memory area 510 contains the operating system image file which client 110 has retrieved from server 200 and is about to execute. Memory area 544 contains a floppy drive Int13$h$ interrupt redirector which is registered as a last step in this example of boot up execution, before relinquishing control to the operating system image to perform subsequent boot up processing (step 490). In FIG. 5B, it is shown as being loaded in memory area 544, which is where its instructions are located. In this particular example, it has been loaded into memory area 544 just under the EBDA in memory area 530. The appropriate pointer would also have been registered into the IVT in memory area 580.

As noted previously, under other conditions, a client starts up under DOS by attempting to read operating system image files from the floppy drive. In this example, the process continues in step 490 by passing control to the appropriate location or instruction in the operating system image which, in non-RIPL environments, might be called to begin the bootup process. When a client starts up and issues a read request, the floppy drive interceptor that has been registered in memory intercepts the request and converts it into a memory read request. Instead of reading data from the floppy, the data comes from the operating system image file loaded into memory. Since the client thinks that it has a floppy drive, the operating system image requires all of the low-level data normally contained on a floppy disk. This includes the system sectors, FAT table, and directory tables. The image also consists of a CONFIG.SYS file and the necessary device drivers that are required for the desired configuration. In other words, the operating system image file should be an exact image of the floppy that the client believes is in drive "A:".

One of the advantages of the present invention is its ability to load nearly any target operating system as a RIPL client. The RIPL client need not be concerned with RIPL environment restrictions as system resources used during the Remote IPL process are freed when the loaded operating system is booted. In particular, the client may load its own network protocol after the Remote IPL process is complete.

Another advantage is that by taking a snapshot of key system data areas during initialization and the use of a bootable image, the system can be reset using the snapshot data area rather than being left in a state partially tailored to the Remote IPL process, and a virtual bootable image can be loaded as a new operating system.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media, such a floppy disc, a hard disk drive, a RAM, and CD-ROMs, and transmission-type media, such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A method for booting a client computer, the method comprising the computer-implemented steps of:

saving a copy of at least one critical system data area;

retrieving a boot image from a server and storing the boot image in memory;

restoring at least one previously saved critical system data area freeing memory to which the copy of at least one critical system data area was saved; and booting the client computer from the boot image stored in memory.

2. The method according to claim 1 further comprising severing a network connection of the client computer before booting the client computer from the boot image stored in memory.

3. The method according to claim 2 wherein the copy of the at least one critical system data area is saved in a location in memory that is not overwritten until after the network connection is severed.

4. The method according to claim 1 wherein the at least one critical system data area is restored by making an exact copy of the corresponding, previously saved critical system data area.

5. The method according to claim 1 wherein the at least one critical system data area is restored through memory block transfers.

6. The method according to claim 1 wherein the boot image is a boot diskette image.

7. A data processing system for booting a client computer, the data processing system comprising:

saving means for saving a copy of at least one critical system data area;

retrieval means for retrieving a boot image from a server and storing the boot image in memory;

restoration means for restoring at least one previously saved critical system data area;

memory freeing means for freeing memory to which the copy of at least one critical system data area was saved; and booting means for booting the client computer from the boot image stored in memory.

8. The data processing system according to claim 7 further comprising severance means for severing a network connection of the client computer before booting the client computer from the boot image stored in memory.

9. The data processing system according to claim 8 wherein the copy of the at least one critical system data area is saved in a location in memory that is not overwritten until after the network connection is severed.

10. The data processing system according to claim 8 wherein the at least one critical system data area is restored by making an exact copy of the corresponding, previously saved critical system data area.

11. The data processing system according to claim 8 wherein the at least one critical system data area is restored through memory block transfers.

12. The data processing system according to claim 8 wherein the boot image is a boot diskette image.

13. The system of claim 7, further comprising network connection means for establishing a network connection using a predetermined network protocol according to a predetermined preference stored in the boot image.

14. A computer program product for use with a data processing system for booting a client computer, the computer program product comprising:

a computer usable medium;

first instructions for saving a copy of at least one critical system data area;

second instructions for retrieving a boot image from a server and storing the boot image in memory;

third instructions for restoring at least one previously saved critical system data area;

fourth instructions for freeing memory to which the copy of at least one critical system data area was saved; and fifth instructions for booting the client computer from the boot image stored in memory.

15. The computer program product according to claim 14 further comprising sixth instructions for severing a network connection of the client computer before booting the client computer from the boot image stored in memory.

16. The computer program product according to claim 15 wherein the copy of the at least one critical system data area is saved in a location in memory that is not overwritten until after the network connection is severed.

17. The computer program product according to claim 14 wherein the at least one critical system data area is restored by making an exact copy of the corresponding, previously saved critical system data area.

18. The computer program product according to claim 14 wherein the at least one critical system data area is restored through memory block transfers.

19. The computer program product according to claim 14 wherein the boot image is a boot diskette image.

20. The computer program product of claim 14, further comprising sixth instructions for establishing a network connection using a predetermined network protocol according to a predetermined preference stored in the boot image.

21. A method for booting a client computer, the method comprising the computer-implemented steps of:

retrieving a boot image from a server and storing the boot image in memory;

booting the client computer from the boot image stored in memory; and establishing a network connection using a predetermined network protocol according to a predetermined preference stored in the boot image.

* * * * *